US009297924B2

(12) United States Patent
FitzSimmons

(10) Patent No.: US 9,297,924 B2
(45) Date of Patent: Mar. 29, 2016

(54) METHOD AND SYSTEM OF DISPLAYING DATA SETS INDICATIVE OF PHYSICAL PARAMETERS ASSOCIATED WITH A FORMATION PENETRATED BY A WELLBORE

(75) Inventor: Clark D. FitzSimmons, Denver, CO (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 815 days.

(21) Appl. No.: 12/647,742

(22) Filed: Dec. 28, 2009

(65) Prior Publication Data
US 2011/0157235 A1 Jun. 30, 2011

(51) Int. Cl.
*G06T 15/20* (2011.01)
*G06T 17/05* (2011.01)
*G01V 99/00* (2009.01)

(52) U.S. Cl.
CPC ............... *G01V 99/00* (2013.01); *G06T 15/20* (2013.01); *G06T 17/05* (2013.01); *G06T 2215/16* (2013.01)

(58) Field of Classification Search
None
See application file for complete search history.

(56) References Cited

U.S. PATENT DOCUMENTS

| 5,276,785 | A * | 1/1994 | Mackinlay et al. | ........... 345/427 |
| 7,606,666 | B2 * | 10/2009 | Repin et al. | ...................... 702/9 |
| 2002/0050989 | A1 * | 5/2002 | Sanstrom | ...................... 345/419 |
| 2006/0190178 | A1 * | 8/2006 | Zamora et al. | ................... 702/9 |
| 2007/0213935 | A1 * | 9/2007 | Fagnou et al. | ...................... 702/6 |
| 2010/0283788 | A1 * | 11/2010 | Rothnemer et al. | .......... 345/473 |

OTHER PUBLICATIONS

Andrew H. Hanson, "Quaternion Frame Approach to Streamline Visualization", IEE Transaction on Visualization and Computer Graphics, vol. 1, No. 2, Jun. 1995.
http://www.austingeo.com/downloads_videos.php (author unknown), AGM website, (accessed Dec. 28, 2009).

* cited by examiner

*Primary Examiner* — Daniel Hajnik

(57) ABSTRACT

Displaying data sets indicative of physical parameters associated with a formation penetrated by a wellbore. At least some of the illustrative embodiments are methods including: obtaining data regarding a trajectory of a wellbore; obtaining a first data set indicative of a first physical parameter associated with a formation penetrated by the wellbore; obtaining a second data set indicative of a second physical parameter associated with the formation; displaying a two-dimensional image that simulates a three-dimensional trajectory of the wellbore, the two-dimensional image from a particular viewpoint relative to the three-dimensional trajectory of the wellbore; displaying along the two-dimensional image a representation of the first data set on a first surface that abuts the trajectory of the wellbore; and displaying along the two-dimensional image a representation of the second data set on a second surface that abuts the trajectory of the wellbore.

18 Claims, 6 Drawing Sheets

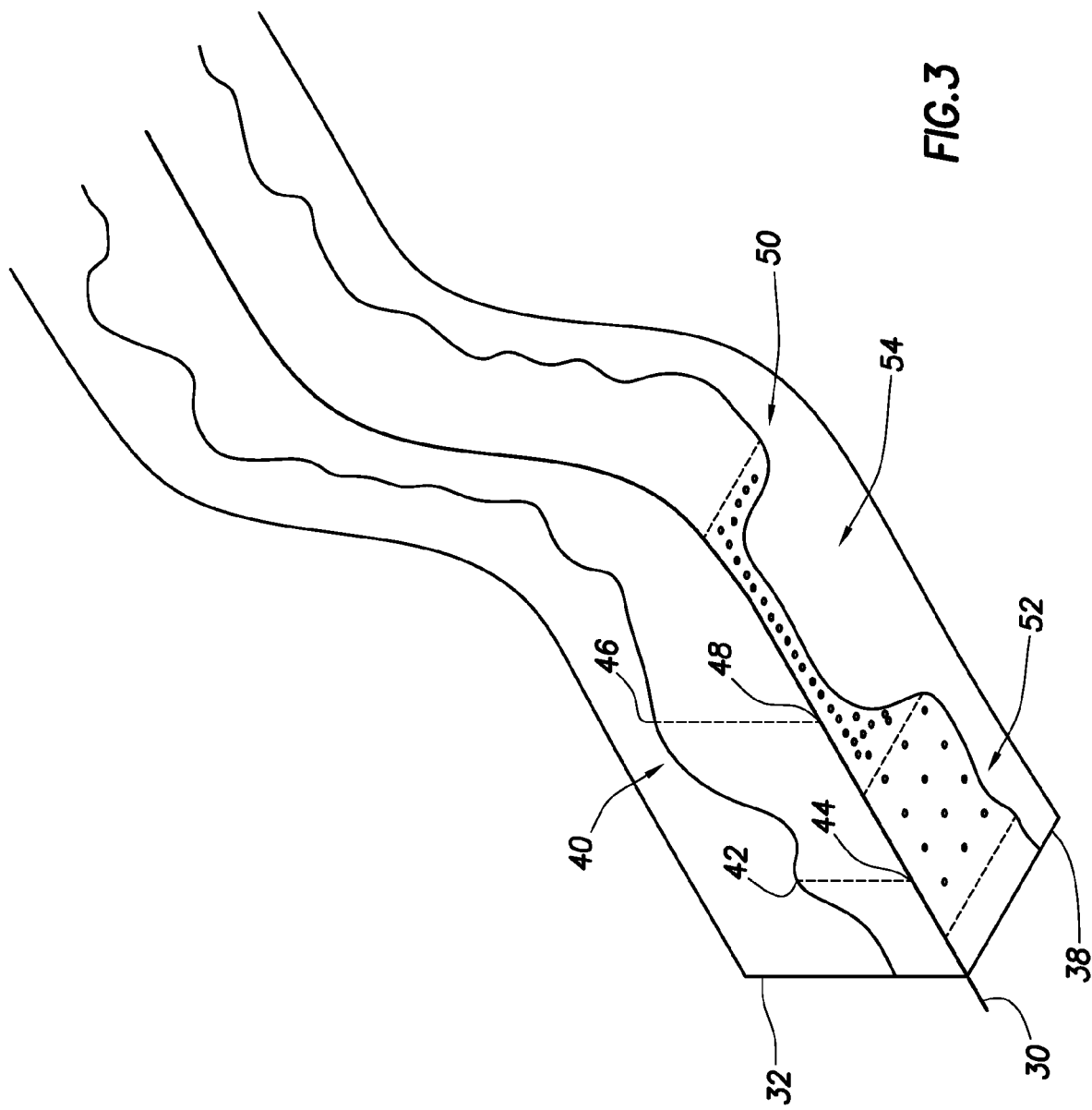

METHOD AND SYSTEM OF DISPLAYING DATA SETS INDICATIVE OF PHYSICAL PARAMETERS ASSOCIATED WITH A FORMATION PENETRATED BY A WELLBORE

BACKGROUND

In the continuing advancements in recovery of natural resources, such as oil and natural gas trapped in underground formations, many companies use computer systems to help synthesize data from a plurality of wells to obtain an overall picture of the underground formation. Such synthesis assists geologists in making determinations such as the best reservoir extraction technique, and whether and where to drill additional wells to aid the extraction.

Each well, however, may have multiple pieces of information associated with the well. For example, a well may have: measured resistivity over a plurality of depths; measured porosity over the plurality of depths; and measured macroscopic capture cross section over the plurality of depths. Related art visualization techniques pick one data type and display the data correlated to depth as a "lathe" display. That is, the one data type is selected, and for each particular depth the particular data value associated with the depth is "spun" around the well trajectory such that the apparent inside diameter of the well in the visualization is based on the value of the data at the particular depth. While the lathe technique may adequately display a single data set, in many situations the geologist may need to visualize the correlation between two or more formation parameters, such as resistivity and porosity at a particular depth. The lathe technique does not adequately address such needs.

Thus, any advance in the synthesis and visualization of data for one or more wells would provide a competitive advantage in the market place.

BRIEF DESCRIPTION OF THE DRAWINGS

For a detailed description of exemplary embodiments, reference will now be made to the accompanying drawings in which:

FIG. 3 shows a perspective view of a distal end of a trajectory of a wellbore including mathematical curves on the blades;

NOTATION AND NOMENCLATURE

Figure 2:
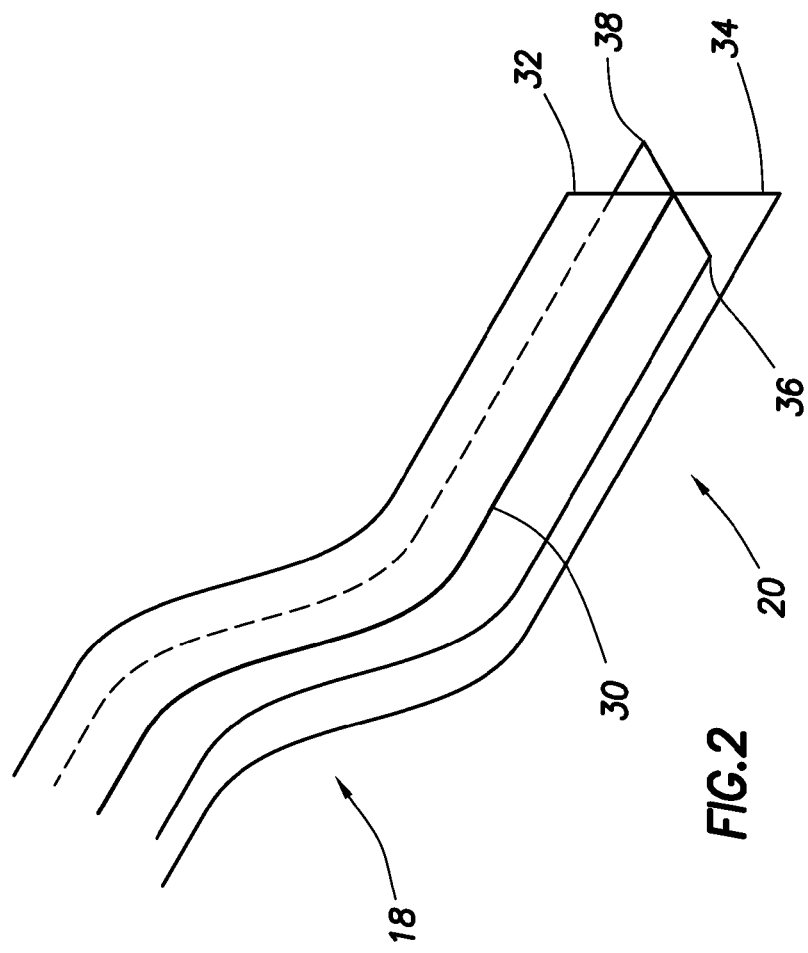
FIG. 2 shows a perspective view of a distal end of a trajectory of a wellbore, including blades emanating from the trajectory.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection or through an indirect connection via other devices and connections.

"Wellbore" shall mean a hole drilled into the Earth's crust used directly or indirectly for the exploration or extraction of natural resources, such as oil, natural gas or water.

"Consistent orientation relative to the trajectory of the wellbore" shall mean that for portions of a wellbore trajectory with dissimilar horizontal direction, an imaging surface that abuts the trajectory along the portions has the same orientation with respect to the wellbore trajectory for each portion. Stated otherwise, a first vector normal to the trajectory and swept along a first portion of the trajectory defines a first imaging surface, a second vector normal to the trajectory and swept along a second portion of the trajectory with a different horizontal direction defines a second imaging surface, and the first and second imaging surfaces have the same orientation with respect to the trajectory when viewed from a fixed viewing point.

"Horizontal direction" shall be the projection of a trajectory into a horizontal plane.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to mechanisms to simultaneously display or "visualize" data sets associated with wellbores that penetrate Earth formations. For ease of description, the various embodiments are discussed in terms of a single wellbore penetrating one or more Earth formations. The single wellbore has associated therewith a plurality of data sets, where each data set represents a physical parameter associated with the formation penetrated by the wellbore or the wellbore itself. However, the various embodiments may also be used to display multiple data sets associated with respective multiple wellbores simultaneously, and thus the nature of the description shall not be read as a limitation as to the applicability of the various embodiments.

Figure 1:
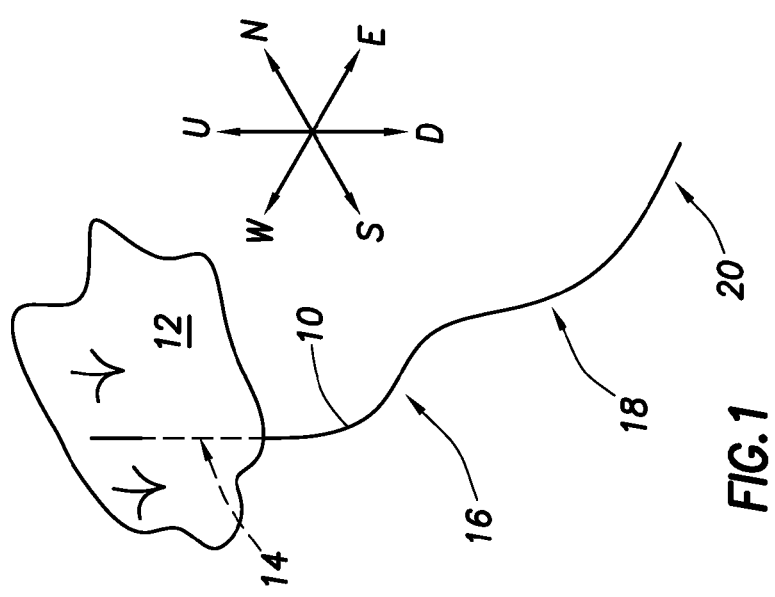
FIG. 1 shows a perspective view an illustrative trajectory of a wellbore.

FIG. 1 illustrates a wellbore 10, which wellbore 10 may be drilled into the Earth for purposes of exploration and/or extraction of natural resources, such as hydrocarbons (e.g., oil and gas) and water. The balance of this description assumes wellbore 10 is drilled for purposes of exploration and/or extraction of hydrocarbons, but such assumption shall not be read to limit the techniques described only to hydrocarbon exploration. Moreover, it is noted that the wellbore 10 need not itself be a hydrocarbon producing wellbore. In some case, wellbores are drilled for exploratory purposes, or for other purposes that aid in the extraction of hydrocarbons, such as injection wells. Illustrative wellbore 10 has a trajectory (i.e., a three-dimensional path through the underlying Earth formation(s)) that can be considered to start at the surface 12 of the Earth. Initially, the illustrative wellbore 10 is substantially vertical, as illustrated by portion 14. After extending some distance into the Earth, the illustrative wellbore 10 turns toward the East and the downward slope decreases, as indicated by portion 16. Thereafter, the downward slope of the illustrative wellbore 10 increases again, as illustrated by portion 18. The slope of the illustrative wellbore 10 then decreases to the point where the wellbore 10 is substantially horizontal, as illustrated by portion 20. While illustrative wellbore 10 has no trajectory change from the East direction, the wellbore 10 may likewise change trajectory in any three-dimensional direction.

At various times during creation of the wellbore 10, data regarding physical parameters of the one or more formations penetrated by the wellbore may be gathered. For example, the drill string that creates wellbore 10 may include measuring-while-drilling or logging-while-drilling devices that read physical parameters of the formations as the drill bit creates the wellbore 10. Further, at various times during the drilling process the drill string may be removed from the wellbore 10, and a wireline logging tool run therein, where the wireline logging tool gathers data regarding the physical parameters of the formations penetrated by the wellbore 10. Further still, after drilling is complete and wellbore 10 is cased, additional logging tools may be run in the wellbore 10.

The type of data sets created by the data gathering processes also varies. For example, the various tools may measure physical parameters of the formations as a function of depth, such as porosity, electrical resistivity (reciprocal of conductivity), density, natural gamma production, responses to neutron interrogation, and capture cross-section. Moreover, the physical parameters of some data sets may provide information regarding properties of the wellbore itself as a function of depth, such as casing thickness, cement thickness, and casing bond impedance.

Regardless of the precise nature of the parameters that a particular data set contains, in order to be useful the data sets are presented to geologist or other interested party by way of display device of a computer system. In many cases it is the correspondence between multiple parameters that is of interest. For example, a high porosity value at a particular location in the wellbore (indicating large pore spaces in the rock of the formation) along with low resistivity may indicate the presence of hydrocarbons in the formation that may be easily produced. Thus, based on the illustrative correspondence between porosity and resistivity, a geologist or completions expert may elect to perforate the casing at the particular location, allowing the hydrocarbons to flow into the casing.

In order to simultaneously display multiple data sets, the various embodiments combine the data sets, along with data regarding trajectory of the wellbore, into a form the inventor hereof coins a "blade" display, as illustrated by FIG. 2. In particular, FIG. 2 illustrates the distal portion of the wellbore 10 of FIG. 1, and particularly portions 18 and 20. The heavy center line illustrates the portion of the wellbore trajectory 30. Trajectory 30 only represents the center-line of the wellbore (or some other consistent feature), and does not in-and-of itself represent internal diameter of the borehole. Emanating from the trajectory 30 are an illustrative four imaging surfaces 32, 34, 36 and 38. Illustrative imaging surface 32 extends along and abuts the trajectory 30, and also extends upward from the trajectory 30 in the illustrative view of FIG. 2. Imaging surface 34 extends along and abuts the trajectory 30, and also extends downward from the trajectory 30 in the illustrative view of FIG. 2. Imaging surface 36 extends along and abuts the trajectory 30, and also extends to the left from the trajectory 30 in the illustrative view of FIG. 2. Finally, imaging surface 38 extends along and abuts the trajectory 30, and also extends to the right from the trajectory 30 in the illustrative view of FIG. 2. Thus, each imaging surface 32, 34, 36 and 38 appears as a "blade" extending outward from trajectory 30. An alternative way to conceptualize the imaging surfaces 32, 34, 36 and 38 is that each imaging surface 32, 34, 36, and 38 represents an area swept out by a vector originating at the trajectory 30 and normal to the trajectory 30 at each point, and the vector translated along the trajectory 30. The imaging surfaces 32, 34, 36 and 38 are equivalently referred to as either imaging surfaces or blades for the balance of this specification.

While FIG. 2 shows four blades 32, 34, 36 and 38, four blades is merely illustrative. Two or more blades may be used (e.g., seven blades, twelve blades), limited only by an ability of the user or viewer to distinguish the data sets presented. Second, the blades 32, 34, 36 and 38 need not be orthogonal as illustrated in FIG. 2. For example, for a system where three blades are used, the angle between adjacent blades may be 120 degrees. Further, the blades need not be evenly distributed about the trajectory 30; rather, the blades may be bunched at a particular location relative to the trajectory, such as all the blades on the "upper" portion of the trajectory 30. Further still, the blades 32, 34, 38 and 40 need not be visible in-and-of themselves. For example, as is discussed more below, a representation of a datum from a data set may be disposed along a blade, and thus while logically present the blade may be transparent to the viewer. Finally, while in some embodiments the illustrative blades 32, 34, 36 and 38 are two-dimensional in the sense there is no discernable thickness, in other embodiments, particularly embodiments where a blade is itself at least partially visible, the blade may also have thickness if such aids in the display of information.

In accordance with various embodiments, a representation of data from a data set is created on a blade such that the representation conveys to the viewer the magnitude that the physical parameters represent at each respective location or depth within the wellbore. FIG. 3 illustrates the trajectory 30 of FIG. 2 from a different viewing position (e.g., as selected by a viewer or user). In particular, FIG. 3 illustrates blades 32 and 38 of FIG. 2, with blades 34 and 36 omitted so as not to unduly complicate the figure. Data from a first data set indicative of a physical parameter associated with a formation are represented on the blade 32, and data from a second data set indicative of a physical parameter associated with a formation are represented on blade 38. In particular, the representation of the data set on the blade 32 is in the form of a mathematical curve 40, where the magnitude of the physical parameter at the respective location along the trajectory 30 is shown by the distance of the mathematical curve or discrete spatial series 40 from the trajectory 30 at each respective location. For example, the magnitude of the physical parameter represented by point 42 (which corresponds to location 44 along the trajectory 30) is lower than the magnitude of the physical parameter represented by point 46 (which corresponds to location 48 along the trajectory 30). While blade 32 is shown as visible in illustrative FIG. 3, in some embodiments the blade may not be visible, but the presence of the blade may be identifiable by the discrete spatial series 40 that resides on the blade 32. Stated another way, the discrete spatial series 40 may define the blade 32 emanating from, extending and/or abutting the trajectory 30. While FIG. 3 shows only one discrete spatial series on blades so as not to unduly complicate the figures, in other embodiments multiple discrete spatial series may reside on each blade.

In some embodiments, having a discrete spatial series appear to hover over the trajectory 30 at a consistent orientation relative to the trajectory 30 is sufficient to convey the information represented by the data set to a user. However, in other embodiments discrete spatial series may appear to attach to or connect to the trajectory by a texture or color, and in some embodiments the magnitude of the physical parameter represented by the discrete spatial series is shown by texture or color for each data point (in addition to or in place of the distance of the data point). In particular, the representation of the data set on the blade 38 is in the form of a discrete spatial series 50, where the magnitude of the physical parameter at the respective locations along the trajectory 30 is shown by the distance of the discrete spatial series 50 from the trajectory 30 at each respective location. In addition, the area between the discrete spatial series 50 and the trajectory 30 has a color or texture with an attribute selected based on the magnitude of the physical parameter. For example, in the first area 52 a color attribute of the pixels is selected based on the magnitude of the physical parameter (the color attribute illustrated by the dot density). Likewise, in the second area 54 a color attribute of the pixels is selected based on the magnitude of the physical parameter (the color attribute illustrated by the increased dot density). In an illustrative case, as the magnitude of the physical parameter increases, the color may be more intense, or change color, all representative of the magnitude of the physical parameter. As yet another example, the visual texture created by the pixels in each region may change based on the magnitude of the physical parameter (e.g., smooth area representing a large magnitude, and a coarse area representing a smaller magnitude). Additionally, in spite of the color or texture, the color or texture may be partially transparent such that data values on other blades may be visible through the closest blade from the viewing position. The partially transparent attributes are not specifically shown so as not to unduly complicate the drawings.

Figure 4:
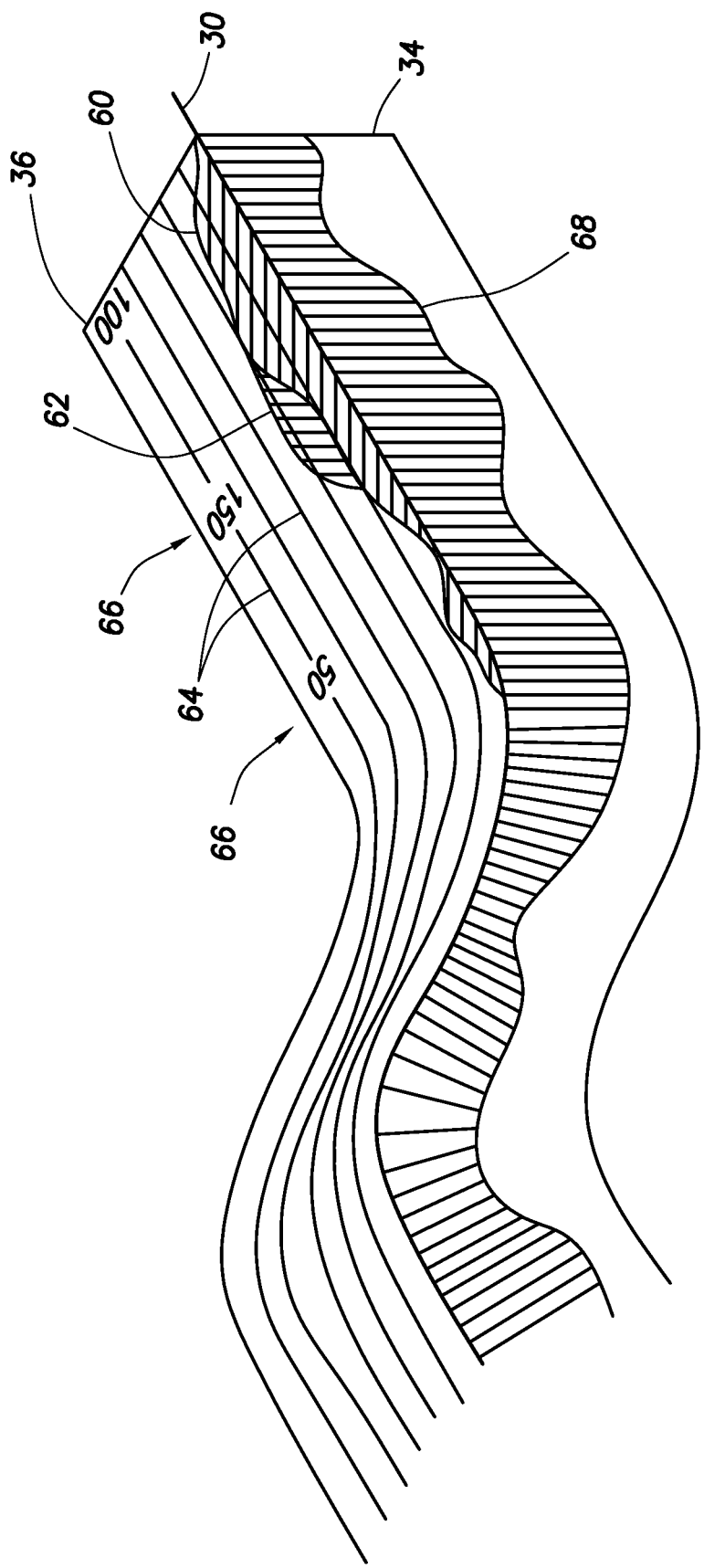
FIG. 4 shows a perspective view of a distal end of a trajectory of a wellbore including mathematical curves on the blades.

The various embodiments described to this point have been based on the data sets containing time- or depth-series information; however, the data sets may take other forms. For example, in some cases a data set may be in the form of a raster image (i.e., a picture, such as a JPEG compliant picture). FIG. 4 illustrates the trajectory 30 of FIG. 2 from a different viewing position (e.g., as selected by a viewer or user). In particular, FIG. 4 illustrates blades 34 and 36 of FIG. 2, with blades 32 and 38 omitted so as not to unduly complicate the figure. Data from a data set in the form of a raster image, and indicative of one or more physical parameters associated with a formation, are represented on the blade 36, and data from time- or depth-series data set are represented on blade 34. In particular, the representation of the data set on the blade 36 illustrates a raster image containing an illustrative two discrete spatial series 60 and 62. Additionally, the illustrative raster image has lines 64 that illustrate particular magnitude thresholds, as well as various text messages 66. Thus, the magnitudes represented by the discrete spatial series 68 on blade 34 may be analyzed in relation to the discrete spatial series 60 and 62 in the raster image on blade 36.

Figure 5:
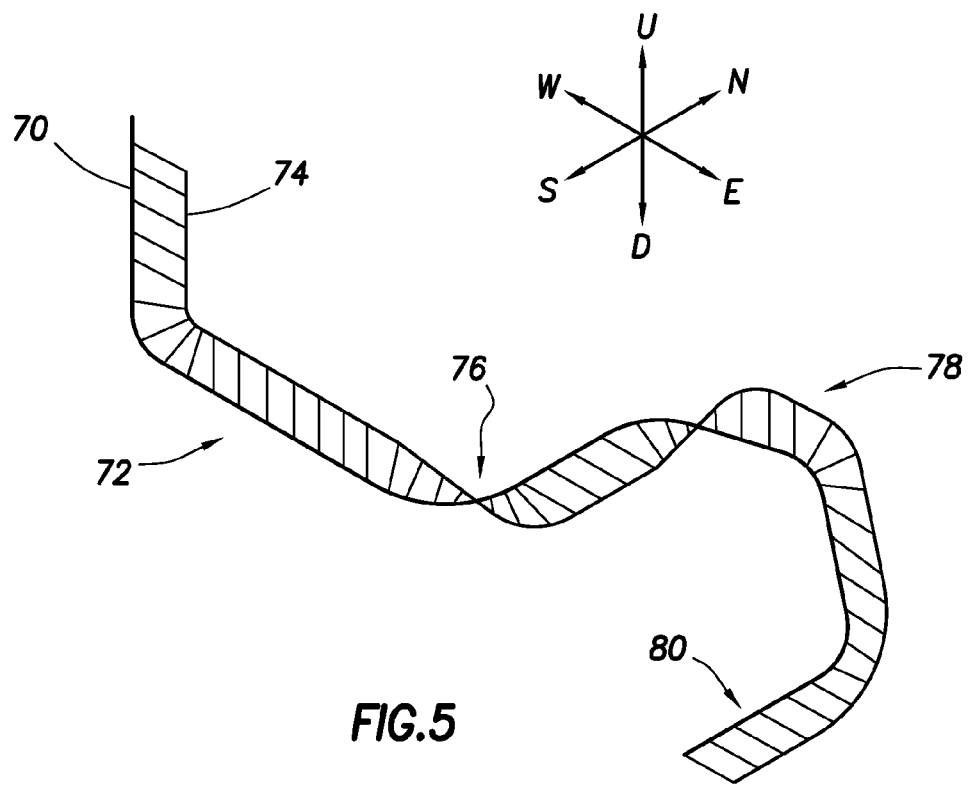
FIG. 5 shows a perspective view of a trajectory of a wellbore with a blade taking an inconsistent position relative to the trajectory.

One of the features of various embodiments that aids in visualization is the consistent orientation of the blades relative to the trajectory of the wellbore. Consider, for purposes of explanation, the illustrative wellbore of FIG. 5. Illustrative wellbore 70 initially makes a turn to the East, as shown at portion 72. An illustrative blade 74 that extends toward the East near the imaging surface, and which retains its Eastward projection, becomes the upper-most blade when the trajectory makes the Eastward turn (again at portion 72). The wellbore 70 then makes an illustrative turn to the North, and in keeping the illustrative blade 74 projecting Eastward, the blade 74 becomes a blade on the side of the trajectory, as illustrated at portion 76. The illustrated Eastward projecting blade 74 again becomes a blade on the top of the trajectory when the wellbore makes another Eastward turn as illustrated by portion 78. Finally, as the wellbore 70 makes a turn to the South, the blade 74 again becomes a blade on the side of the trajectory, as shown at portion 80. The inventor has found that visualization by a viewer in situations where the blades take an inconsistent position with respect to the trajectory is difficult.

Figure 6:
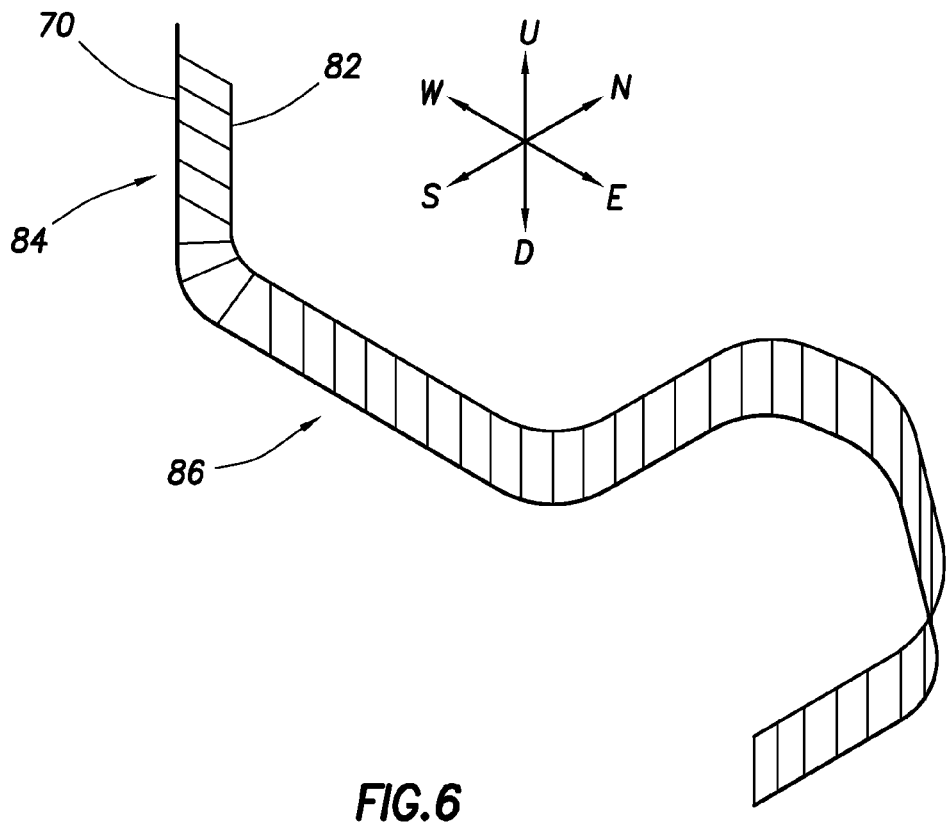
FIG. 6 shows a perspective view of a trajectory of a wellbore with a blade taking a consistent position relative to the trajectory.

In order to address the concern regarding visualization and the blades taking inconsistent orientations based on trajectory of the wellbore, the various embodiments consistently orient the blades relative to the trajectory of the wellbore regardless of the direction or directional changes of the trajectory. FIG. 6 illustrates a trajectory 70 the same as that of FIG. 5, but in this case the blade 82 takes a consistent orientation relative to the trajectory of the wellbore. In particular, initially the blade 82 takes an Eastward projection, as illustrated at portion 84. As the trajectory takes an Eastward turn, the blade 82 becomes the blade on the top of the trajectory, as illustrated by portion 86. The blade 82 remains the blade on the top of the trajectory throughout the remaining trajectory changes. FIG. 6 illustrates a single blade so as not to unduly complicate the figure; however, additional blades likewise take consistent orientations over the trajectory in at least some of the various embodiments. Furthermore, while discussed in terms of an imaging surface abutting and extending along the trajectory 70, the blade 82 may be equivalently conceptualized as the surface created by a vector originating from the trajectory, and normal to the trajectory at each location, swept along the trajectory. When viewed from a fixed viewing position (e.g., the viewing point of FIG. 6), the imaging surface has the same relative orientation with respect to the trajectory.

Although there may be many mathematical mechanisms to calculate the orientation of each blade such that each blade has a consistent orientation with respect to the trajectory (i.e., the mathematical rotations of the at changes in trajectory), the inventor of the present specification has found that quaternions present a computationally efficient mechanism to calculate the rotations. Quaternions are a mathematical tool that represents points in three-dimensional Euclidian space as points in a four-dimensional vector space. The advantage of the four-dimensional vector space representation is that mathematical rotations (e.g., the mathematical rotations used to calculate the blade orientation on trajectory changes) are mathematical operations easily performed on processors of computer systems. In particular, mathematical rotations in the four-dimensional vector space are mere conjugations of quaternion representations. Calculating the respective orientation of the blades so that each blade takes a consistent orientation relative to the trajectory is a specific implementation of parallel transport based on quaternion frames. For more information regarding parallel transport techniques based on quaternion frames, the reader is directed to the article by Andrew J. Hanson and Hui Ma titled "Quaternion Frame Approach to Streamline Visualization", IEEE Transactions on Visualization and Computer Graphics, Vol. 1, No. 2, June 1995. One having ordinary skill in the art, now apprised by this specification as to the advantages of representation of multiple physical parameters on respective imaging surfaces or blades as herein described, and also now apprised that the difficulty of calculating a consistent orientation of the blades may be solved by use of the parallel transport techniques, could modify the parallel transport techniques of the Hanson article to implement a system as described herein without undue experimentation.

Figure 7:
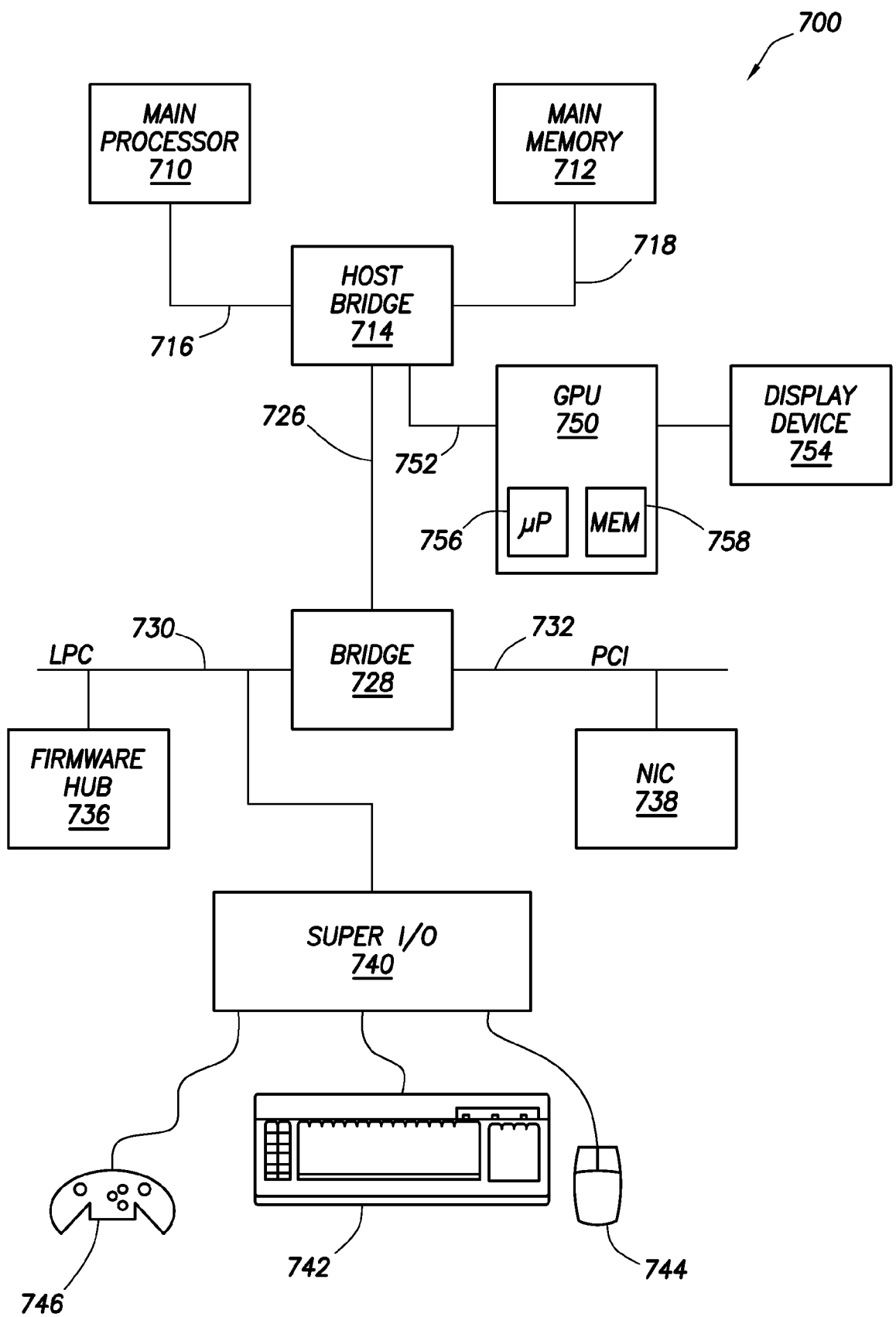
FIG. 7 shows a computer system in accordance with at least some embodiments.

In order to describe the interactions between various processors of a computer system to implement the display of data sets regarding wellbores as described above, as well as animation of movement relative to a wellbore, the specification now turns to an illustrative computer system. FIG. 7 illustrates a computer system 700 in accordance with at least some embodiments. In particular, computer system 700 comprises a main processor 710 coupled to a main memory array 712, and various other peripheral computer system components, through integrated host bridge 714. The main processor 710 may be a single processor core device, or a processor implementing multiple processor cores. Furthermore, computer system 700 may implement multiple main processors 710. The main processor 710 couples to the host bridge 714 by way of a host bus 716, or the host bridge 714 may be integrated into the main processor 710. Thus, the computer system 300 may implement other bus configurations or bus-bridges in addition to, or in place of, those shown in FIG. 7.

The main memory 712 couples to the host bridge 714 through a memory bus 718. Thus, the host bridge 714 comprises a memory control unit that controls transactions to the main memory 712 by asserting control signals for memory accesses. In other embodiments, the main processor 710 directly implements a memory control unit, and the main memory 712 may couple directly to the main processor 710. The main memory 712 functions as the working memory for the main processor 710 and comprises a memory device or array of memory devices in which programs, instructions and data are stored. The main memory 712 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 712 is an example of a non-transitory computer-readable medium storing programs and instructions, and other examples are disk drives and flash memory devices.

The illustrative computer system 700 also comprises a second bridge 728 that bridges the primary expansion bus 726 to various secondary expansion buses, such as a low pin count (LPC) bus 730 and peripheral components interconnect (PCI) bus 732. Various other secondary expansion buses may be supported by the bridge device 728. In accordance with some embodiments, the bridge device 728 comprises an Input/Output Controller Hub (ICH) manufactured by Intel Corporation, and thus the primary expansion bus 726 comprises a Hub-link bus, which is a proprietary bus of the Intel Corporation. However, computer system 700 is not limited to any particular chip set manufacturer, and thus bridge devices and expansion bus protocols from other manufacturers may be equivalently used.

Firmware hub 736 couples to the bridge device 728 by way of the LPC bus 732. The firmware hub 734 comprises read-only memory (ROM) which contains software programs executable by the main processor 710. The software programs comprise programs executed during and just after power on self tests (POST) procedures as well as memory reference code. The POST procedures and memory reference code perform various functions within the computer system before control of the computer system is turned over to the operating system.

The computer system 700 further comprises a network interface card (NIC) 738 illustratively coupled to the PCI bus 732. The NIC 738 acts as to couple the computer system 700 to a communication network, such the Internet.

Still referring to FIG. 7, computer system 700 may further comprise a super input/output (I/O) controller 740 coupled to the bridge 728 by way of the LPC bus 730. The Super I/O controller 740 controls many computer system functions, for example interfacing with various input and output devices such as a keyboard 742, a pointing device 744 (e.g., mouse), game controller 746, various serial ports, floppy drives and disk drives. The super I/O controller 740 is often referred to as "super" because of the many I/O functions it performs.

The computer system 700 further comprises a graphics processing unit (GPU) 750 coupled to the host bridge 714 by way of bus 752, such as a PCI Express (PCI-E) bus or Advanced Graphics Processing (AGP) bus. Other bus systems, including after-developed bus systems, may be equivalently used. Moreover, the graphics processing unit 750 may alternatively couple to the primary expansion bus 726, or one of the secondary expansion buses (e.g., PCI bus 732). The graphics processing unit 750 couples to a display device 754 which may comprise any suitable electronic display device upon which any image or text can be displayed. The graphics processing unit 750 comprises an onboard processor 756, as well as onboard memory 758. The processor 756 may thus perform graphics processing, as commanded by the main processor 710. Moreover, the memory 758 may be significant, on the order of several hundred megabytes or more. Thus, once commanded by the main processor 710, the graphics processing unit 750 may perform significant calculations regarding graphics to be displayed on the display device, and ultimately display such graphics, without further input or assistance of the main processor 710.

Figure 8:
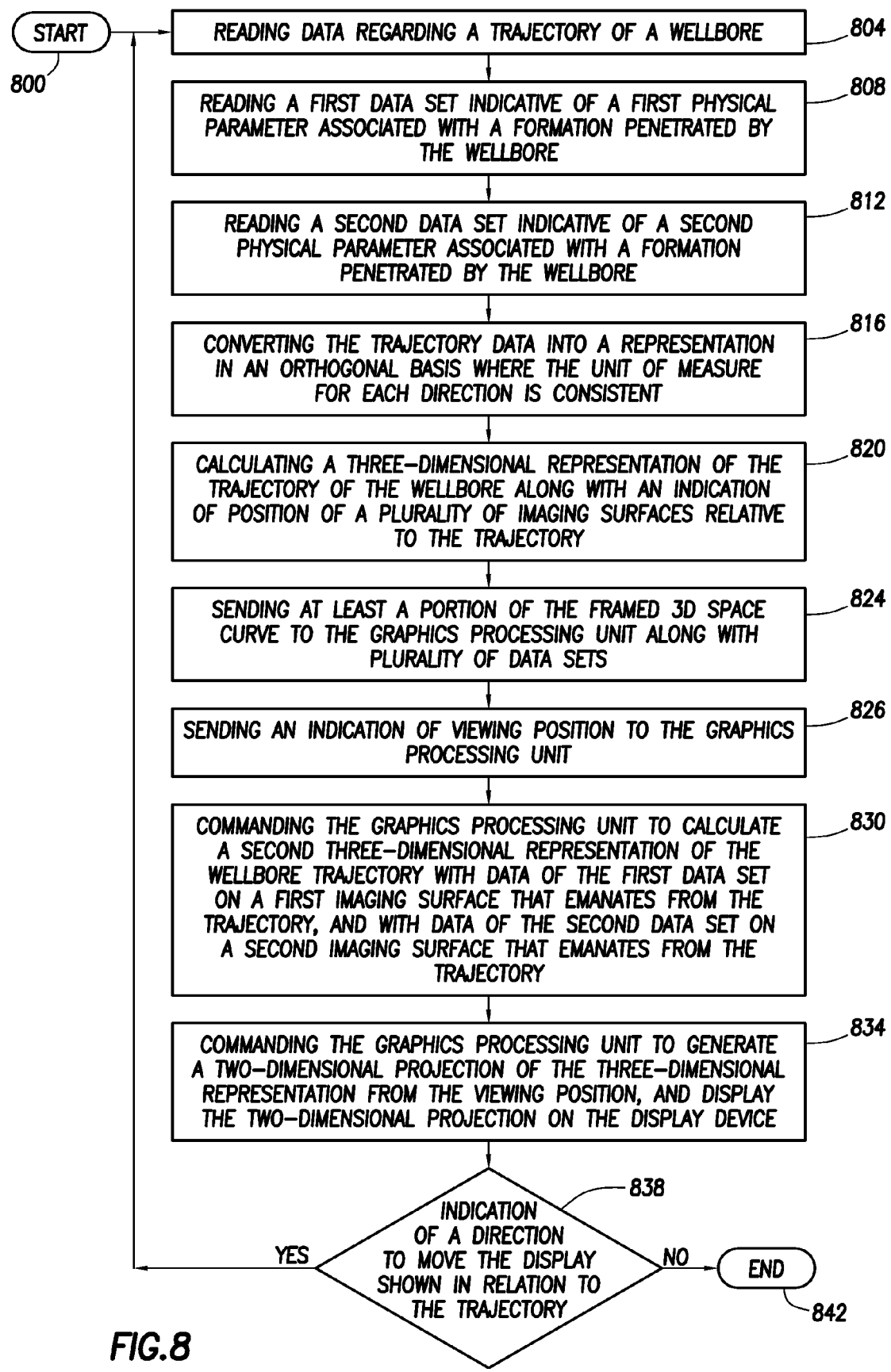
FIG. 8 shows a method in accordance with at least some embodiments.

The specification now turns to discussion of a particular implementation of creating a representation of the trajectory of one or more wellbores, along with representations of data sets along blades, in accordance with at least some embodiments. FIG. 8 shows an illustrative method (e.g., software) in accordance with the various embodiments. The method steps illustrated in FIG. 8 are merely illustrative. In alternative embodiments the steps may be performed in a different order, some steps combined with other steps, operations separated into separate steps, and/or various steps omitted. In particular, the method starts (block 800) and proceeds to reading or obtaining data regarding a trajectory of a wellbore (block 804). In some embodiments, the main processor 710 obtains the trajectory data by reading the data from an input/output device (e.g., a disk or flash drive coupled to the super I/O controller 740, or the NIC 738), and places the trajectory data in the main memory 712. The trajectory data may take many forms. In some cases the data regarding trajectory of the wellbore is in the form of a series of data points in the Universal Transverse Mercator (UTM) system (with the addition of depth data). In other cases the wellbore trajectory is in the form of a series of data points in a geodetic coordinate system.

Next, the main processor 710 reads or obtains a first data set indicative of a first physical parameter associated with a formation penetrated by the wellbore (block 808), and reads or obtains a second data set indicative of a second physical parameter associated with a formation penetrated by the wellbore (block 812). In some embodiments, the main processor 710 obtains the data sets by reading the data sets from an input/output device (e.g., a disk or flash drive coupled to the super I/O controller 740, or the NIC 738), and places the data sets in the main memory 712. The data sets may take many forms. In some cases one or more of the data sets are time- or depth-series data sets. In other cases, one or more of the data sets are raster images. In each case, the data points of each data set are correlated or indexed directly or indirectly to depth in the wellbore.

In many situations, the data representative of trajectory of the wellbore is represented in a coordinate system where the unit of measure for horizontal directions is different than the unit of measure for vertical (depth) directions. Stated otherwise, in some cases wellbore trajectory data is subjected to depth exaggeration. Such depth exaggeration is not itself a problem; however, in performing the quaternion-based parallel transport mentioned above to calculate the consistent position of the blades, depth exaggeration tends to cause inconsistent results. Thus, the next step in the illustrative method is to convert the trajectory data into a representation in an orthogonal basis where the unit of measure for each direction is consistent (block 816). The conversion orthogonal basis is not limited to Euclidean space, and may take any form (e.g., orthogonal sine and cosine space), and will be referred to henceforth as "conversion space". In cases where the wellbore trajectory is not represented in a depth exaggerated coordinate system, the conversion to a conversion space may be omitted, and the coordinate system of the wellbore trajectory as read may be considered the conversion space.

Once the wellbore trajectory is converted to the conversion space, the main processor 710 performs the calculation to determine the consistent orientation of one or more blades relative to the trajectory of the wellbore (e.g., performs the quaternion-based parallel transport discussed above). Stated otherwise, the main processor 710 calculates a three-dimensional representation of the trajectory of the wellbore along with an indication of position of a plurality of imaging surfaces relative to the trajectory (block 820). The three-dimensional representation of the trajectory of the wellbore along with an indication of position of a plurality of imaging surfaces relative to the trajectory may be referred to as a framed three-dimensional (3D) space curve (with "framed" here indicating that the local normal, tangent and binormal vectors have been computed at each geometry point). While possible to store the three mentioned vectors directly in the form of nine floating point values, in some embodiments the three vectors are stored as a quaternion since the local normal, tangent and binormal can be readily derived from the quaternion.

Before proceeding, it should be understood that the main processor in these embodiments does not calculate the extent of the blades or data location on the blades, but rather performs the parallel transport, and then associates with each data point of the wellbore trajectory a quaternion for each blade that represents an operator for mathematical rotations to be performed by the graphics processing unit 750. As technology advances, and/or main processors are constructed to be more efficient at graphics processing, some or all the calculations performed by the graphics processing unit 750 may be performed on the main processor 710.

Once the framed 3D space curve is calculated, the illustrative method moves to the main processor 710 sending at least a portion of the framed 3D space curve to the graphics processing unit along with plurality of data sets (block 824), and also sending an indication of viewing position to the graphics processing unit (block 826). The viewing position may be determined from any input/output device, such as the keyboard 742, mouse 744 or game controller 746.

Thereafter, the main processing unit 710 commands the graphics processing unit 750 to perform a series of actions. First, the main processing unit commands the graphics processing unit to calculate a second three-dimensional representation of the wellbore trajectory with data of the first data set on a first imaging surface that emanates from the trajectory, and with data of the second data set on a second imaging surface that emanates from the trajectory (block 830). The second three-dimensional representation is, in some embodiments, a series of vertices forming triangles, and thus may be referred to as a tessellated representation. Thereafter, the main processor 710 commands the graphics processing unit 750 to generate a two-dimensional projection (also known a homogenous clip space) of the three-dimensional representation from the viewing position, and display the two-dimensional projection on the display device 754 (block 834).

Commanding the graphics processing unit 750 by the main processor 710 may take many forms depending on the type of graphics processing unit 750. In at least some embodiments, the processor 756 of the graphics processing unit 750 comprises a plurality of programmable "shaders". The term "shaders" is a term of art originally used to refer to processors that performed shading calculations; however, the term "shaders" now refers to any graphics processing and thus should not be read to limit the functionality to just shading calculations. In particular, in at least some embodiments converting the framed 3D space curve to the tessellated representation (including the imaging surfaces with data thereon), and further converting the tessellated representation to the two-dimensional projection involves three shaders: a vertex shader; a geometry shader; and a pixel shader. Each shader is discussed in turn.

The vertex shader, executed once per geometry point and/or once per point in the data sets, combines the framed 3D space curves with the data from the data sets into a three-dimensional representation of the final image (homogenous clip space), but the representation has yet to be converted into the triangle representations (has yet to be tessellated). As part of combining, the vertex shader calculates the rotations dictated by the quaternions sent from the main processor 710.

Next, the geometry shader gathers adjacent geometry points (i.e., there may be more resolution in the homogenous clip space than can be displayed) and tessellates the image (including a depth or z-value for each pixel) based on the viewing position parameter. Next, a geometry shader generates or adds detail to the two-dimensional representation as desired.

Finally, a pixel shader calculates the two-dimensional projection (also known as performing the perspective divide), then colors each pixel (e.g., using the depth or z-value), clips the image (removes portions that will not be viewable, either because of horizontal position and depth within the image (z-value)) and rasterizes the triangular primitives.

Each of the shaders is a program sent by the main processor 710 to the graphics processing unit 750. The programs sent are not inherent in the graphics processing unit, or, necessarily, in the computer system. The shaders are thus programmed by the programmer that develops the overall program. Thus, the functionality discussed for each shader above may be combined or performed in different orders, and other shaders (e.g., a rasterization shader may be used in addition to, or in place of, the shaders discussed above).

Although the various illustrative steps of the method of FIG. 8 are divided among the main processor 710 and the graphics processing unit 750, as advancements make the main processor better at performing graphics-type calculations, more of the graphics processing may take place on the main processor 710. Likewise, as advancements increase the performance capability of graphics processors, more the graphics processing may take place on the graphics processing unit 750.

The various embodiments discussed to this point have assumed a single frame on the display device showing the trajectory of the wellbore along with data sets on blades, from a particular viewing position. However, the various embodiments also contemplate animating on the display device movement relative to the trajectory. In particular, the main processor 710 may receive from the viewer or user an indication of a direction to move the display shown in relation to the trajectory (e.g., game controller 746 joystick movement) (block 838). The main processor 710 thus sends a series of viewing position indications to the graphics processing unit 750, with the graphics processing unit 750 generating an updated two-dimensional projection (a frame update) based on each in the series of viewing position indications. For smooth animation between a staring point and ending point, the main processor 710 should send at least twenty different viewing positions a second, and likewise the graphics processing unit 750 updates the two-dimensional projection at least twenty times a second. Faster frame rates provide visually smoother movement "through" the scene. Otherwise, the illustrative method ends (block 842).

From the description provided herein, those skilled in the art are readily able to combine software created as described with appropriate general-purpose or special-purpose computer hardware to create a computer system and/or computer subcomponents in accordance with the various embodiments, to create a computer system and/or computer subcomponents for carrying out the methods of the various embodiments, and/or to create a non-transitory computer-readable storage media for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, some formation and/or wellbore parameters are logged as a function of time (with a known speed of travel of the logging instrument). Thus, determining the correlation between the parameter and a particular depth or location in the wellbore may involve a translation between a time/speed indication and depth. It is intended that the following claims be interpreted to embrace all such variations and modifications.

What is claimed is:

1. A method comprising:
   obtaining, by a computer system, data regarding a trajectory of a wellbore;
   obtaining, by the computer system, a first data set related to a first physical parameter of a formation penetrated by the wellbore, the first data set including values of the first physical parameter of the formation along the trajectory of the wellbore;
   obtaining, by the computer system, a second data set related to a second physical parameter of the formation that is distinct from the first physical parameter, the second data set including values of the second physical parameter of the formation along the trajectory of the wellbore;
   displaying on a display device of the computer system a two-dimensional representation of a three-dimensional trajectory of the wellbore from a viewpoint relative to the three-dimensional trajectory of the wellbore;
   displaying a mathematical curve representing the values of the first physical parameter of the formation along the trajectory of the wellbore, based on the first data set, wherein the displayed mathematical curve is a two-dimensional representation of the first data set on a first surface that extends along and abuts the displayed two-dimensional representation of the three-dimensional trajectory of the wellbore on the display device such that the first surface has consistent orientation relative to the trajectory of the wellbore, and a relative distance of the mathematical curve from the two-dimensional representation of the three-dimensional trajectory of the wellbore represents a relative magnitude of each of the respective values of the first physical parameter of the formation along the trajectory of the wellbore;
   setting a color attribute of pixels on the display device between the two-dimensional representation of the three-dimensional trajectory of the wellbore and the mathematical curve based on the relative magnitude of the first physical parameter of the formation; and
   displaying a two-dimensional representation of the second data set on a second surface that is distinct from first surface and that extends along and abuts the displayed two-dimensional representation of the three-dimensional trajectory of the wellbore on the display device such that the second surface has consistent orientation relative to the trajectory of the wellbore.

2. The method of claim 1 wherein obtaining the first data set further comprises obtaining a data series, where each datum of the data series represents a physical parameter of the formation, and each datum in the data series is correlated to a location along the trajectory of the wellbore.

3. The method of claim 1 wherein obtaining the first data set further comprises obtaining a raster image of a data set that represents a physical parameter as of the formation.

4. The method of claim 1 further comprising animating movement on the display device relative to the trajectory of the wellbore as a user changes the viewpoint relative to the three-dimensional trajectory of the wellbore.

5. The method of claim 4 wherein animating further comprises updating at least a portion of the display at a rate of at least 20 frames per second.

6. The method of claim 1 wherein the first surface and the second surface abut an outer portion of the trajectory of the wellbore.

7. The method of claim 1, further comprising:
   performing, by the computer system, mathematical rotations of the first surface that extends along and abuts the displayed two-dimensional representation of the three-dimensional trajectory of the wellbore and the second surface that extends along and abuts the displayed two-dimensional representation of the three-dimensional trajectory of the wellbore, such that the first surface has consistent orientation relative to the trajectory of the wellbore and the second surface has consistent orientation relative to the trajectory of the wellbore, the consistent orientation of the first surface different than the second surface.

8. A non-transitory computer-readable storage medium storing a program that, when executed by a main processor of a computer system, causes the main processor to perform a plurality of functions, including functions to:
   read trajectory data that indicates a trajectory of a wellbore;
   read a first data set related to a first physical parameter of a formation penetrated by the wellbore, the first data set including values of the first physical parameter of the formation along the trajectory of the wellbore;
   read a second data set related to a second physical parameter of the formation that is distinct from the first physical parameter, the second data set including values of the second physical parameter of the formation along the trajectory of the wellbore;
   generate a three-dimensional representation of the trajectory of the wellbore to be displayed on a display device of the computer system by a graphics processing unit of the computer system, the three-dimensional representation of the wellbore trajectory including an indication of a location of each of a plurality of imaging surfaces relative to the trajectory of the wellbore;

send to the graphics processing unit the first and second data sets along with at least a portion of the generated three-dimensional representation of the trajectory of the wellbore to be displayed by the graphics processing unit from a first viewing position; and command the graphics processing unit to:

display on the display device a mathematical curve representing the values of the first physical parameter of the formation along the trajectory of the wellbore, based on the first data set, wherein the displayed mathematical curve is a two-dimensional projection of the first data set on a first of the imaging surfaces that extends along and abuts a two-dimensional representation of the portion of the three-dimensional representation of the trajectory of the wellbore at a first location, and a relative distance of the mathematical curve from the two-dimensional representation of the portion of the three-dimensional representation of the trajectory of the wellbore represents a relative magnitude of each of the respective values of the first physical parameter of the formation along the trajectory of the wellbore;

set a color attribute of pixels on the display device between the two-dimensional representation of the portion of the three-dimensional representation of the trajectory of the wellbore and the mathematical curve, based on the relative magnitude of the first physical parameter of the formation; and display on the display device a two-dimensional projection of the second data set on a second of the imaging surfaces that extends along and abuts the two-dimensional representation of the portion of the three-dimensional representation of the trajectory of the wellbore at a second location, wherein the two-dimensional projections of the first and second data sets on the respective first and second imaging surfaces are to be displayed by the graphics processing unit from the first viewing position such that the first and second imaging surfaces have consistent orientations relative to the trajectory of the wellbore at the respective first and second locations.

9. The non-transitory computer-readable storage medium of claim 8 wherein the functions performed by the main processor further include functions to compute a mathematical rotation of the first imaging surface such that first imaging surface has consistent orientation relative to the trajectory of the wellbore.

10. The non-transitory computer-readable storage medium of claim 8 wherein the main processor further commands the graphics processing unit to cull data from the first and second data sets based on the first viewing position.

11. The non-transitory computer-readable storage medium of claim 8 wherein the main processor further commands the graphics processing unit to generate the two-dimensional projection.

12. The non-transitory computer-readable storage medium of claim 8 wherein the functions performed by the main processor further include functions to:

receive indication of a second viewing position that is distinct from the first viewing position; and send a series of indications of viewing position between the first and second viewing positions such that the graphics processing unit animates on the display device movement between the first viewing position and the second viewing position.

13. The non-transitory computer-readable storage medium of claim 8 wherein the functions performed by the main processor further include functions to read at least one selected from the group consisting of: a series of data points correlated to distance within the wellbore; a series of data points correlated to time; and a raster image of one or more series of data points.

14. A computer system comprising:

a main processor;

a graphics processing unit distinct from and coupled to the main processor;

a display device coupled to the graphics processing unit;

a memory coupled to the main processor, the memory stores a program that, when executed by the main processor, causes the main processor to perform a plurality of functions, including functions to:

read trajectory data that indicates a trajectory of a wellbore, read a first data set related to a first physical parameter of a formation penetrated by the wellbore, the first data set including values of the first physical parameter of the formation along the trajectory of the wellbore, and read a second data set related to a second physical parameter of the formation that is distinct from the first physical parameter, the second data set including values of the second physical parameter of the formation along the trajectory of the wellbore;

generate a three-dimensional representation of the trajectory of the wellbore to be displayed on a display device of the computer system by a graphics processing unit of the computer system, the three-dimensional representation of the wellbore trajectory including an indication of a location of each of a plurality of imaging surfaces relative to the trajectory of the wellbore;

send to the graphics processing unit the first and second data sets along with at least a portion of the generated three-dimensional representation of the trajectory of the wellbore to be displayed by the graphics processing unit from a first viewing position; and command the graphics processing unit to:

display on the display device a mathematical curve representing the values of the first physical parameter of the formation along the trajectory of the wellbore, based on the first data set, wherein the displayed mathematical curve is a two-dimensional projection of the first data set on a first of the imaging surfaces that extends along and abuts a two-dimensional representation of the portion of the three-dimensional representation of the trajectory of the wellbore at a first location, and a relative distance of the mathematical curve from the two-dimensional representation of the portion of the three-dimensional representation of the trajectory of the wellbore represents a relative magnitude of each of the respective values of the first physical parameter of the formation along the trajectory of the wellbore;

set a color attribute of pixels on the display device between the two-dimensional representation of the portion of the three-dimensional representation of the trajectory of the wellbore and the mathematical curve, based on the relative magnitude of the first physical parameter of the formation; and display on the display device a two-dimensional projection of the second data set on a second of the imaging surfaces that extends along and abuts the two-dimensional representation of the portion of the three-dimensional representation of the trajectory of the wellbore at a second location, wherein the two-dimensional projections of the first and second data sets on the respective first and second imaging surfaces are to be displayed by the graphics processing unit from the first viewing position such that the first and second imaging surfaces have consistent orientations relative to the trajectory of the wellbore at the respective first and second locations.

15. The computer system of claim 14 wherein the functions performed by the main processor further include functions to compute a mathematical rotation of the first imaging surface such that first imaging surface has consistent orientation relative to the trajectory of the wellbore.

16. The computer system of claim 14 wherein the functions performed by the main processor further include functions to send an executable program to the graphics processing unit that, when executed by the graphics processing unit, causes the graphics processing unit to generate the two-dimensional projections of the first and second data sets on the respective first and second imaging surfaces.

17. The computer system of claim 14 wherein the main processor further commands the graphics processing unit to:
  generate a second three-dimensional representation of the trajectory of the wellbore that includes data from the first data set to be displayed on the first imaging surface and data from the second data set to be displayed on the second imaging surface, based on the portion of the three-dimensional representation of the trajectory of the wellbore; and
  display the two-dimensional projections of the first and second data sets on the respective first and second imaging surfaces that extend along and abut a two-dimensional representation of the second three-dimensional representation of the trajectory of the wellbore at the respective first and second locations.

18. The computer system of claim 14 wherein the functions performed by the main processor further include functions to:
  receive indication of a second viewing position that is distinct from the first viewing position: and
  send a series of indications of viewing position between the first and second viewing positions such that the graphics processing unit animates on the display device movement between the first viewing position and the second viewing position.

* * * * *